Inventors
Robert R. Perron
Ernest W. Stacey, Dec'd
Helen M. Stacey, Exrx.
By their Attorney Oct. 9, 1956  R. R. PERRON ET AL  2,765,482
SOLE FITTING MACHINES Filed July 8, 1954  6 Sheets-Sheet 2

Inventors.
Robert R. Perron
Ernest W. Stacey Dec'd
Helen M. Stacey Exrx.
By their Attorney

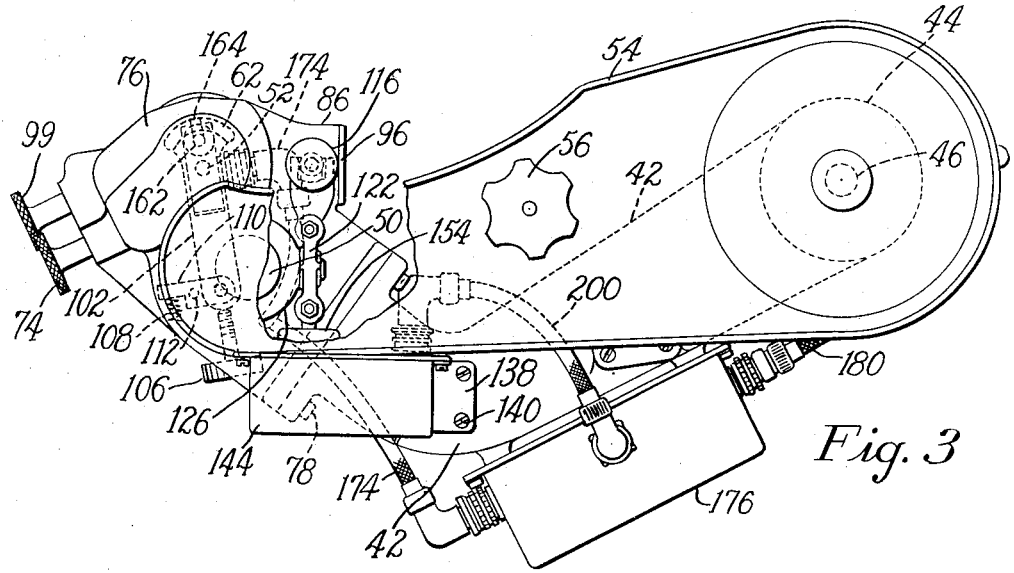
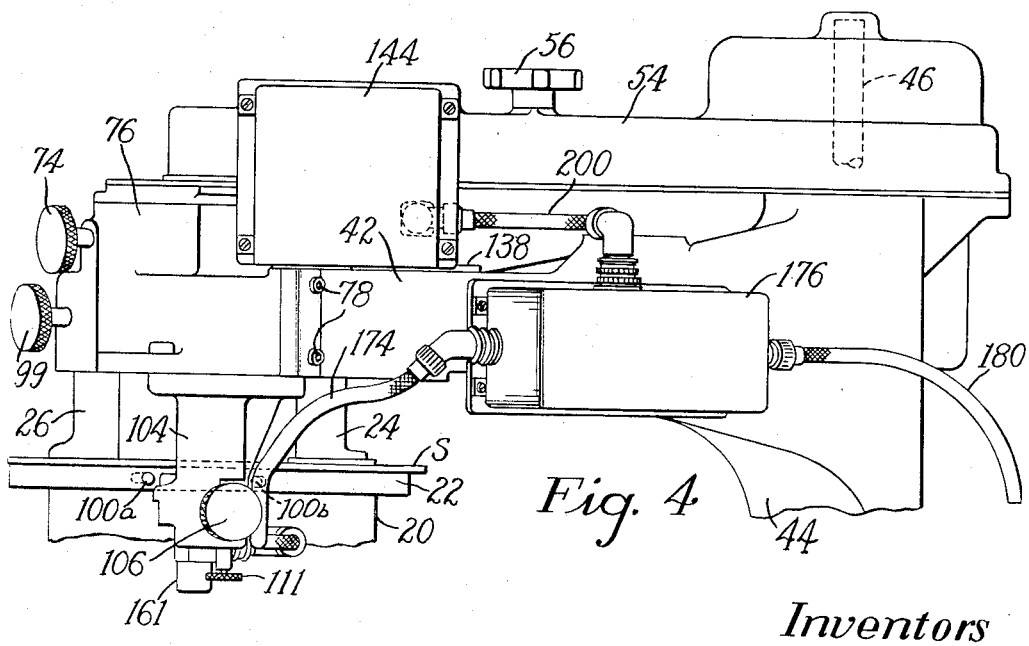

Inventors
Robert R. Perron
Ernest W. Stacey, Dec'd
Helen M. Stacey, Exrx.
By their Attorney Oct. 9, 1956 R. R. PERRON ET AL 2,765,482
SOLE FITTING MACHINES
Filed July 8, 1954 6 Sheets-Sheet 5

Inventors
Robert R. Perron
Ernest W. Stacey, Dec'd
Helen M. Stacey, Exrx.
By their Attorney

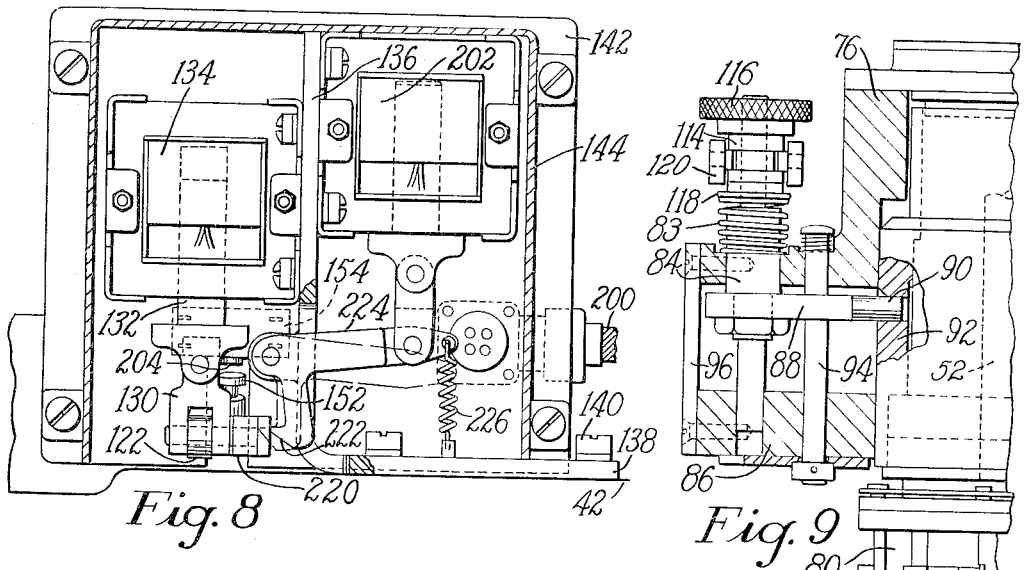
Fig. 8
Fig. 9
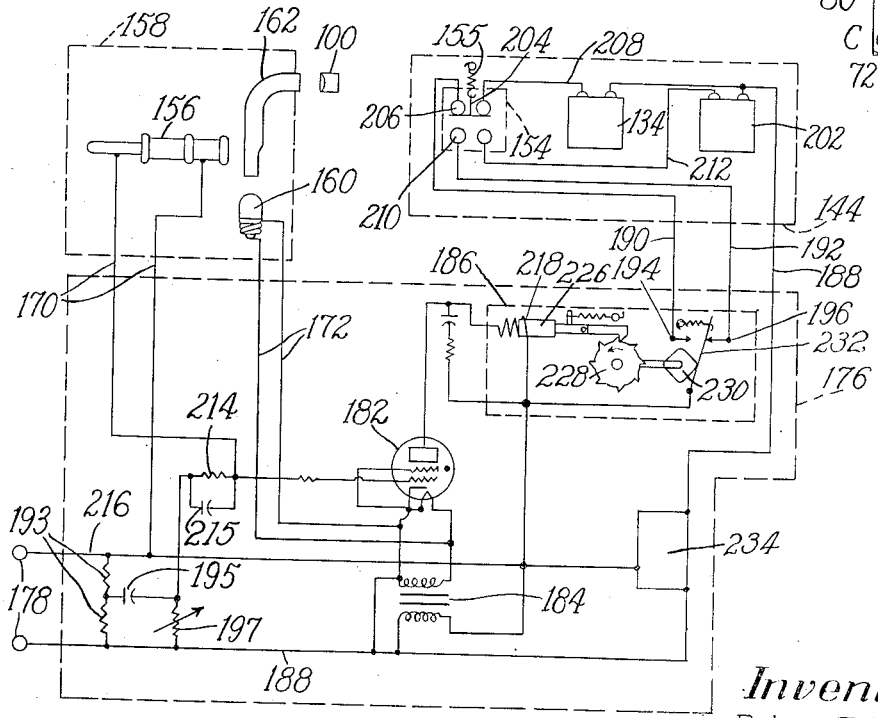
Fig. 10
Inventors
Robert R. Perron
Ernest W. Stacey, Dec'd
Helen M. Stacey Exrx.
By their Attorney

United States Patent Office 2,765,482
Patented Oct. 9, 1956

2,765,482

SOLE FITTING MACHINES

Robert R. Perron, Beverly, Mass., and Ernest W. Stacey, deceased, late of Beverly, Mass., by Helen M. Stacey, executrix, Beverly, Mass., assignors to United Shoe Machinery Corporation, Flemington, N. J., a corporation of New Jersey Application July 8, 1954, Serial No. 442,024

6 Claims. (Cl. 12—85.1)

This invention relates to machines for treating unattached soles of shoes and is illustrated as embodied in a machine of the general type disclosed in United States Letters Patent No. 2,682,674, granted July 6, 1954, upon the application of E. W. Stacey.

Machines of this type are designed for the preparation of soles for use in the manufacture of shoes by the cement process and are so arranged as (a) to round the sole to a particular shape by means of one cutter, (b) to reduce the sole margin, and to rough it by means of another cutter, and (c) to further reduce the shank portions as by means of a third cutter which is arranged for movement into and out of operative position in order that it may treat the desired fractional areas of the margin. Various mechanisms have been devised for controlling the shank-reducing cutter. Some of these included grooves in the periphery of a template clamped for movement with the sole and others used cams mounted upon the sole support for a similar purpose. Such templates and cams are expensive and wear rapidly.

An object of the present invention is to provide an improved means for controlling the shank-reducing cutter which will operate substantially instantaneously and hence will make the control more definite and will avoid the objections above mentioned.

A feature of the invention resides in the utilization of a phototube for scanning the periphery of the usual pattern or template and arranging the tube for response, whenever a signal such as a reflecting button upon the periphery of the template is encountered, during the traversing movement as the periphery of the sole is treated.

Another feature of the invention resides in an electronic arrangement for energizing, in proper sequence, a pair of solenoids one of which moves the shank-reducing cutter into operating position when the first signal is encountered, a latch being provided to hold the cutter in that position. The other solenoid, energized when the next signal is encountered, unlatches the cutter and allows it to be returned to inoperative position. These and other features of the invention will better be understood from the following specification, taken in connection with the accompanying drawings in which:

Fig. 3 is a plan view of the cutter-carrying arm showing part of the electronic control device;

Fig. 4 is a side elevation of the same parts;

Fig. 8 is a detail in elevation of the solenoid and latch mechanism;

Fig. 9 is a view, partly in vertical section, to show a fragment of the cutter head and a connection between an operating solenoid and the shank-reducing cutter; and Fig. 10 is a diagram of the electric circuits involved in the phototube-controlled, electronic mechanism.

The invention is herein illustrated as embodied in a machine substantially like that shown in the above-mentioned patent to which reference may be made for a further description, particularly of driving and operating mechanisms, which are more fully shown and described therein.

Figure 1:
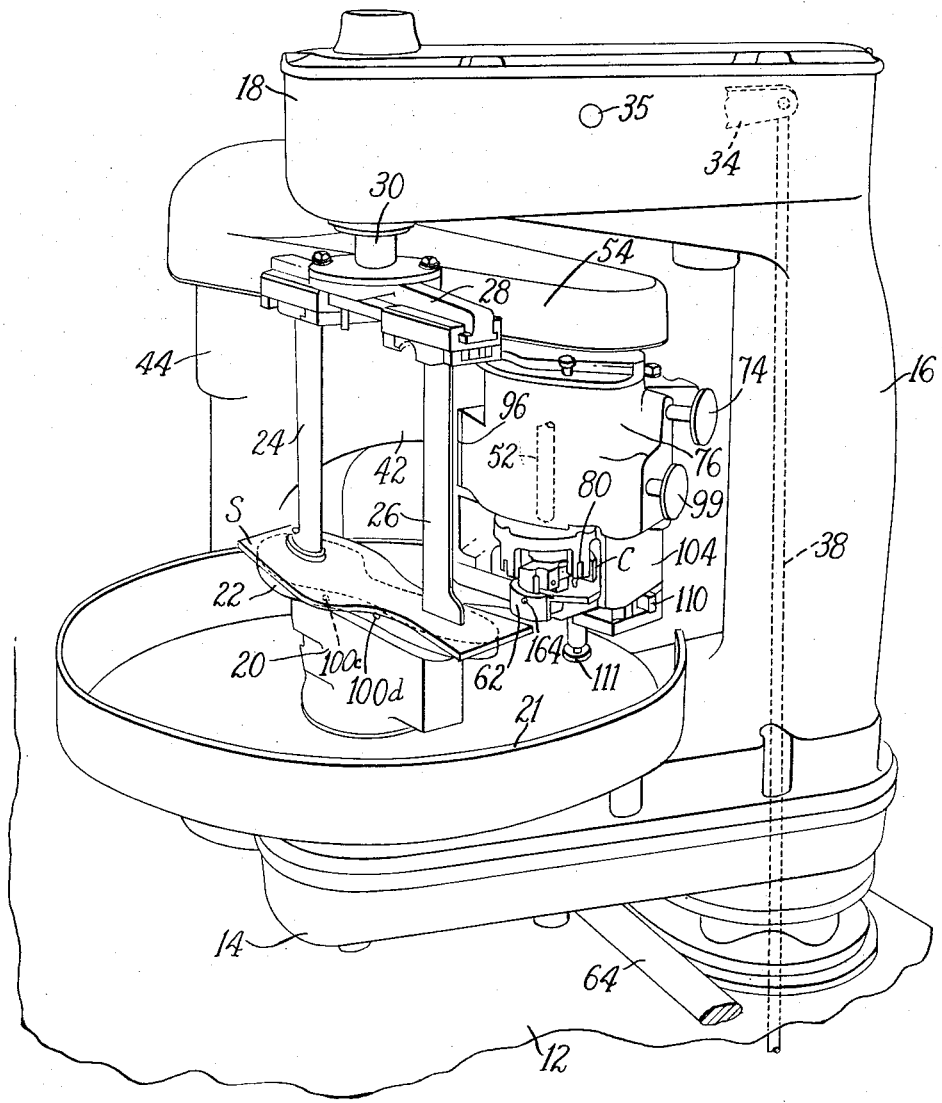
Fig. 1 is an angular view of the head of the machine with the cutter carrying arm in idle position away from the work.
Figure 2:
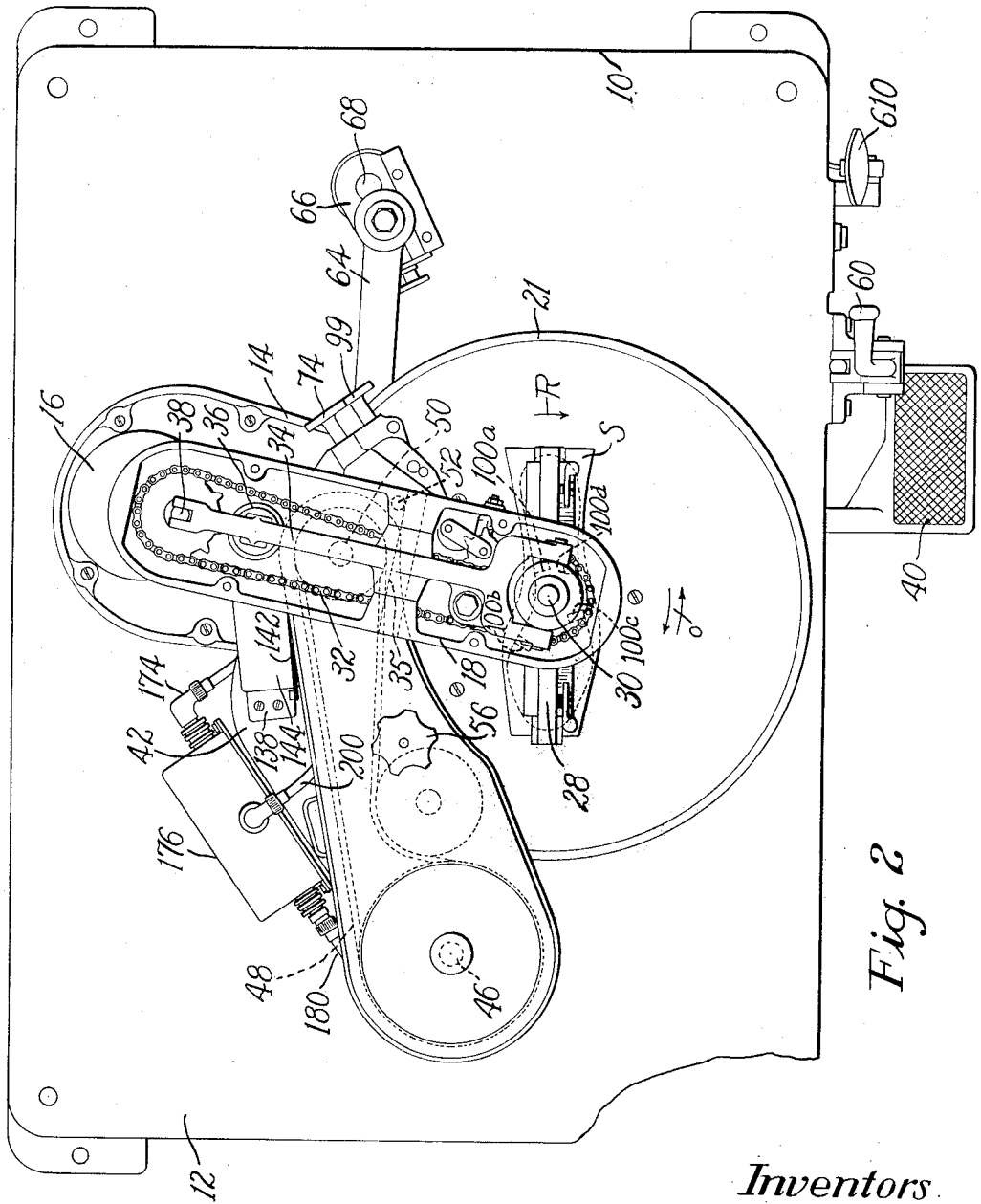
Fig. 2 is a plan view of this same mechanism in the same position.

It will be understood that the machine is provided with a hollow base 10 (Fig. 2) like an inverted box, upon the top surface 12 of which is mounted a swinging work carrier having a lower arm 14 (Fig. 1) and an upstanding hollow column 16 upon which an upper arm 18 is supported. The lower arm supports a rotatable block 20 within a pan 21. This block carries a template 22 upon the top of which is supported a sole S. The sole is held against the template by clamping struts 24 and 26 which are slidably adjustable upon a crossbar 28 carried by an upright shaft 30 which is journaled in the upper arm 18. This upper arm 18 is hollow, as shown in Fig. 2, and contains a chain 32 for driving the shaft 30 and a lever 34 fulcrumed on a cross pin 35 for applying or releasing the clamps. The clamping pressure is delivered by a helical spring 36 underlying the lever 34 and the sole may be released by a vertical rod 38 extending down through the column into the base and operatively connected to a treadle 40. Power for driving the chain is carried by a shaft (not shown) which passes through the upright column 16 and is furnished by a mechanism, contained within the base, which is also arranged to rotate the sole supporting block 20 in synchronism with the upper sole-clamping crossbar 28.

Cutters, denoted generally by the character C (Figs. 1, 5 and 9), are arranged for operation upon the margin and periphery of the sole and to that end they are supported by an arm 42 (Fig. 1) which has an upright portion 44 supported for pivotal movement with respect to the top 12 of the base about the axis of an upright shaft 46 (Figs. 3 and 4). This shaft is power operated and connected by one or more driving belts 48 (Fig. 2) to an intermediate shaft 50 near the outer end of the arm, this shaft being connected by driving gears (not shown) to a cutter shaft 52 (Fig. 1). The driving belt 48 is supported within a casing 54 which swings with the cutter-carrying arm 42 and has on it a belt tightening arrangement including a clamp screw 56. The free end of the arm 42 is provided with a cutter-carrying head or casing 76 attached to the arm by screws 78 (Figs. 3 and 4).

When the cycle of the machine is started by pulling an operator-controlled lever 60 (Fig. 2), the cutter arm 42 is swung to bring the cutters C gently into contact with the sole S at a position determined by a rub member 62 (Figs. 3 and 5) mounted below the head casing 76 and movable with it. The member 62 is yieldably held in contact with the periphery of the template 22 and, at the end of a cycle, the mechanism within the base causes the arm 42 to swing away from the work until it reaches a stop position. An emergency stop lever 610 is provided, for use if needed, to stop the whole machine.

During the operating cycle, the sole carrier block 20 is rotated in the direction of an arrow R (Fig. 2) by the mechanism previously described and this block, supported on the lower carrier arm 14, is oscillated as indicated by arrows o to move the contact point along the sides of the sole by means of a link 64, the right-hand end of which is connected to a crank 66 rotated by a shaft 68 which extends into the frame 10 and is turned in proper relation to the cycle of the machine by a mechanism contained therein. This crank is given two rotations so that the swinging work carrier arm 14, 18 is oscillated from the position shown in Fig. 2 to a position at the right thereof and is returned to the illustrated position twice during the cycle.

It will be noted that the cutter mechanism C, as is described in the above-mentioned patent, consists of three elements, to wit, first, a peripheral trimming mechanism comprising a cutter 70 (Fig. 5), second, a beveling and roughing mechanism comprising the cutter blades 72, both of which mechanisms are carried by a common support urged upwardly by a spring (not shown), and third, a shank-reducing mechanism including a cutter 80.

The operating level of the cutter 70 is determined by a hand screw 74 (Figs. 1, 3 and 4) which is threaded in the head casing 76. The screw 74 is provided with a beveled end working against a notch (not shown) in a member (not shown) which is spring elevated but capable of being moved downwardly as the screw 74 is turned in.

The cutter carrying casing 76 is provided with another adjusting screw 99 operating much the same as does the screw 74 but which is arranged to enable a determination of the uppermost position of the beveling and roughing cutter 72.

The elements of the shank-reducing cutter 80 are supported upon a ring-shaped member 82. This cutter is normally held in its uppermost position by a spring 83 (Fig. 9) which surrounds a vertical slide 84 mounted in a lateral extension 86 of the casing 76. The slide 84 has a grooved collar 114, for a purpose which is later described, resting on a washer 118 at the top of the spring 83. The collar is held by a hand nut 116 and adjustment of this nut determines the operating position of the shank-reducing cutter when it has been moved against the sole. Clamped upon a mid portion of the slide 84 is a plate 88. The inner end of this plate is reduced to a pin 90 received in a sleeve 92 which is slidable vertically to carry the shank-reducing cutter 80 up and down. A vertical pin 94 in the extension 86 cooperates with and passes through an aperture in the plate 88 to keep the latter from swinging sidewise in the casing extension 86. This casing extension is open ended to facilitate the assembly of the parts and is provided with an end cover 96. At the bottom of the cutter mechanism C there is a hand-operated button 98 which may be lifted to declutch the various cutter elements from their driving members and thus to enable their ready removal for sharpening.

The shank-reducing cutter 80 is intended for use only along zones at the sides of the sole and to the rear of the ball line which are known as the shank portions. These zones are determined for any particular type of sole by means of reflector buttons or plugs 100 (shown in Fig. 5) of white plastic and it will be seen from Figs. 1 and 2 that there are two of these plugs on each side of the template. These plugs, which are numbered 100a, 100b, 100c and 100d, cooperate with a photocell mechanism, to be later described, to control the raising and lowering of the shank-reducing cutter 80.

Figure 5:
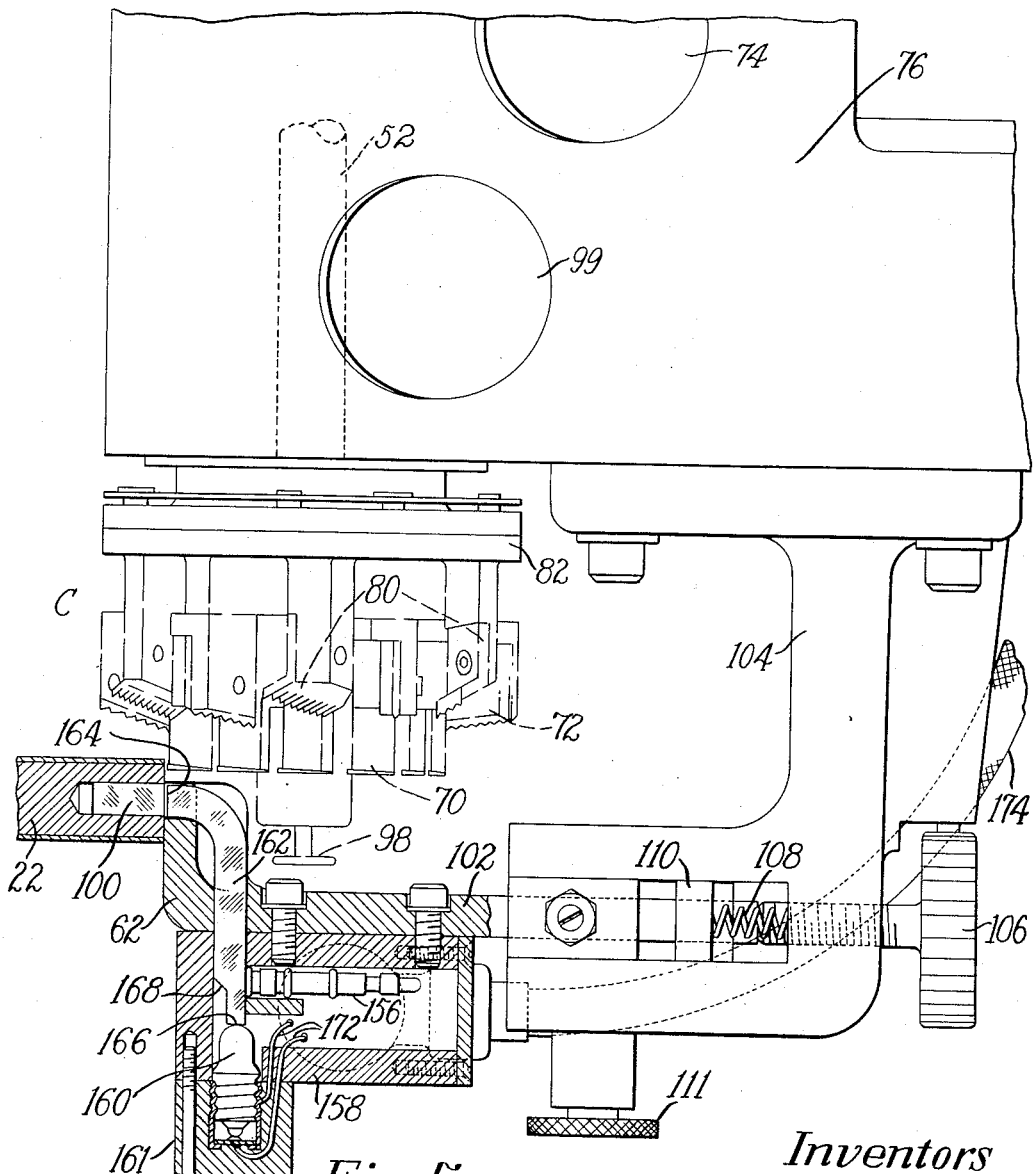
Fig. 5 is an elevation, partly in section and on a larger scale, of the end of a cutter-carrying head and a phototube scanning device which is associated therewith.

When the machine is in operation, the cutter carrying arm 42 holds the rub plate 62 against the periphery of the template (as shown in Fig. 5) and in order that the depth of the cutting action on the periphery of the sole may be adjusted, this rub plate has a supporting slide 102 carried by a depending bracket 104 which is secured to the under side of the cutter casing 76. In this bracket the slide 102 is adjustable in and out by means of a hand screw 106 which is threaded in the bracket and which bears against the end of the slide 102. A clamp screw 111 holds the slide in adjusted position. The slide is normally drawn into the bracket arm by a coiled spring 108 acting against one end of a short lever 110 (Fig. 3) the other end of which is pivoted to the slide 102. The lever has an intermediate fulcrum 112.

Figure 6:
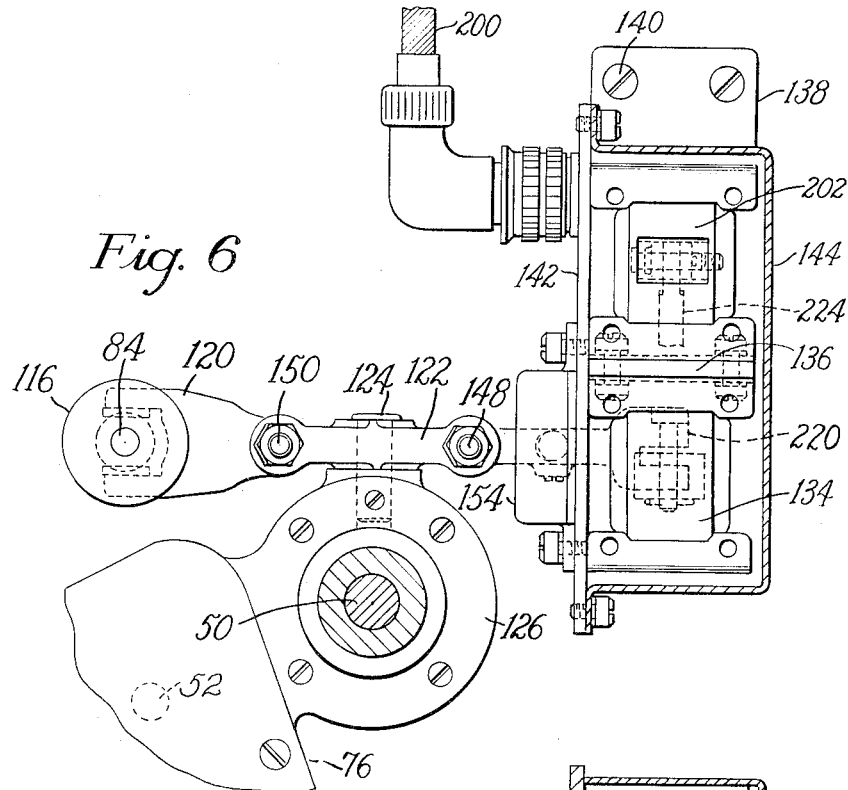
Fig. 6 is a plan view of a cutter-moving mechanism.

Provision is made for quickly moving the shank-reducing cutter 80 up and down at the time when the rub member 62 passes one of the light reflecting plugs 100 and to this end the grooved collar 114 (Fig. 9) cooperates with a forked end 120 of a lever 122 (Fig. 7) mounted upon a pivot 124 (Fig. 6), which pivot is supported in a rounded extension 126 of the casing 76. This extension also serves as a bearing for the upright shaft 50 which is driven to rotate the cutters.

The lever 122 is connected by means of a link 130 (Figs. 7 and 8) to the core 132 of a solenoid 134, this solenoid being mounted upon a plate 136 which is bent laterally at its lower end to provide a bracket 138 attached by screws 140 (Fig. 3) to the top surface of the cutter-carrying arm 42. A casing cooperating with this supporting plate 136 comprises a back plate 142 (Fig. 6) which is welded to the plate 136 at right angles thereto and to this back plate there is removably attached a cover 144. When the solenoid 134 is energized and sucks in the core 132, the lever 122 is tilted against the resistance of the spring 83 and an additional spring 146 (Fig. 7) interposed between the cutter casing extension 86 (Fig. 9) and said lever. The lever is also provided with stop screws 148 and 150 to limit its tilting movement and has at the end adjacent to the solenoid an adjustable abutment screw 152 for shifting a button 204 of a microswitch 154, for a purpose which will later appear, against a spring 155 (shown diagrammatically in Fig. 10) urging its contact arm to the position there shown.

Also attached to the plate 136 is another solenoid 202 (Fig. 8) having its core joined by a link to the horizontal arm 224 of a latch 222. A spring 226 attached to the arm 224 draws it down to cause the latch to underlie a thickened end 220 of the lever 122 after the solenoid 134 has lifted the lever to depress the shank-reducing cutter into contact with a sole.

In order, therefore, that the mechanism including the solenoid 134 which moves the shank-reducing cutter into operating position may be rendered effective whenever the cutting action of the associated cutters 70 and 72 reaches the first light reflecting plug 100a in the template, we have provided a mechanism including a phototube 156 (Fig. 5) which is contained within a housing 158 secured to the under side of the slide 102 on which the template-contacting rub piece 62 is mounted. The space between the under side of the cutter and the pan 21 (Fig. 1) surrounding the work support is small and consequently we have provided a compact arrangement embodying an electric lamp 160 within a lamp socket housing 161 (Fig. 5) and a member 162 which may be made of Lucite or Plexiglas capable of transmitting light around a curve. One end 164 of the rod-like member 162 passes through the template-contacting member 62 at the level of the light reflecting plugs 100a, etc. The other end 166 is directly opposite the electric light 160. At an intermediate point this rod is provided with a reflecting surface 168 positioned at a forty-five degree angle to the sides of the upright portion of the rod and positioned to reflect the light returning from a reflector plug into the phototube 156.

Conductors 170 (Fig. 10) connected to the phototube and conductors 172 connected to the electric lamp 160 are, for safety, passed through a flexible conduit 174 (Figs. 4 and 5) leading to a control box 176 which is mounted upon the side of the cutter carrying arm 42. As the machine's supply cord is plugged in a suitable outlet, current from an alternating current source is delivered by conductors passing through a flexible conduit 180, to terminals 178 (Fig. 10) in this box 176, which contains a thyratron tube 182, a filament transformer 184, a sequence relay switch 186 and various resistances and capacitors. A conductor 188 connected to the source, and conductors 190 and 192, connected respectively to contacts 194 and 196 of the sequence relay switch 186, are passed through another flexible conduit 200 leading to the solenoids 134 and 202 mounted in the casing 144. A voltage divider 193 is bridged across the source terminals 178 and an intermediate point on the divider is connected through a condenser 195 to one end of a variable resistance 197 to provide a grid voltage of a magnitude and phase appropriate for maximum conduction of the thyratron 182.

It will be understood that the microswitch 154, having a stem 204, is normally spring-pressed to a position to bridge contacts 206 interposed between the conductor 190 and a conductor 208 leading to the solenoid 134. The other side of this solenoid is connected to the solenoid 202 and to the conductor 188 leading back to one of the source terminals 178. The microswitch 154 is also provided with another set of contacts 210 which are interposed between the conductor 192 and a conductor 212 leading to the other side of the second solenoid 202.

The photoelectric circuit is a reverse circuit, i.e., one in which the thyratron plate current ceases upon illumination of the cathode of the phototube 156. Such illumination allows electrons to flow during one-half cycle from a conductor 216, through the tube 156, and the resistors 214 and 197, to conductor 188, thereby charging condenser 215 for negative grid bias during the succeeding half-cycle when the thyratron plate is positive. When there is no light on the phototube because the end 164 of the Lucite rod is not opposite to one of the reflector plugs 100, no current will flow through the resistance 214. Consequently when the conductor 216 and the thyratron plate are positive, the grid of the thyratron tube will be positive and plate current will flow through a coil 218 of the relay 186, sucking in a core 226 which has a pawl associated with a rotatable ratchet 228. This ratchet is attached to a square cam 230 against which a switch armature 232 is drawn by a spring. When a corner of the cam 230 engages this switch armature, it is forced against the contact 196, as shown in Fig. 10. When, at the next pull of the pawl, the ratchet 219 is given an eighth of a turn, a flat side of the cam 230 will permit the armature 232 to be drawn against the contact 194.

Figure 7:
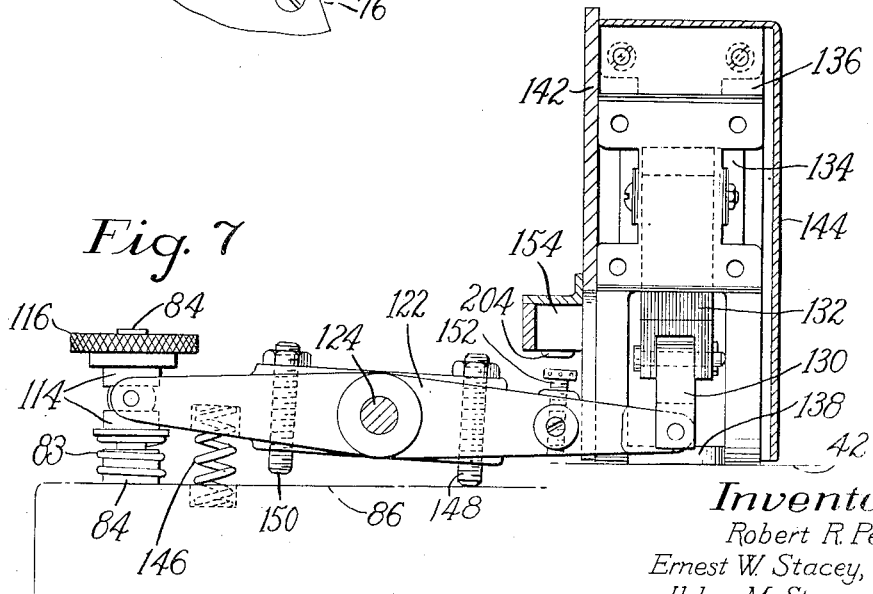
Fig. 7 is a side elevation thereof.

In the operation of the machine, let us assume that the shank-reducing cutter 80 is in raised position as in Fig. 9, that the lever 122 consequently is in the position shown in Fig. 7 and that the switch armature is against the contact 194. When power is first applied to the terminals 178, a thermal delay switch 234 prevents energization of the solenoid 134 until the thyratron 182 conducts to shift the armature to contact 196. Thereafter, the starting of the machine by means of the hand lever 60 will cause the cutter-carrying head or casing 76 to move inwardly toward the sole until the rub member 62 comes in contact with the periphery of the template 22 at a point toward the rear end of the sole from the first reflecting plug or signal 100a.

The traversing movement of the sole carrier will eventually bring this first plug 100a opposite to the Lucite rod 162 whereupon the thyratron 182 will become non-conductive allowing the core 226 of the sequence relay to be drawn to the right by its spring so that its pawl may engage the next tooth of the rachet 228. Just as soon as this plug 100a has passed the rod 162, the thyratron 182 will again become conductive, energizing the relay coil 218 and rotating the cam 230 an eighth of a turn to allow the switch armature 232 to be drawn against the contact 194, because a flat side of the cam is then in contact with the switch armature 232. Power is then fed through the contacts 206 to energize the solenoid 134 which, working through the lever 122, will push the shank-reducing cutter 80 down into operating position.

As soon as the core 132 has been sucked into the solenoid 134, the lever 122 will have been tilted so that its abutment 152 (Fig. 7) has operated the switch 154 by pressing its button 204 and has opened the circuit to the solenoid 134 and has closed the circuit through the contacts 210. It will be understood, however, that the lever 122 will have pushed aside a tapered end of the latch 222 against the tension of the spring 226 and the latch will have snapped into position to hold the cutter in its depressed position.

Between successive reflecting plugs 100 upon the template there is no illumination of the phototube 156 and the sequence relay coil 218 remains energized but causes no change.

However, when the second reflecting plug 100b comes opposite the Lucite rod 162 light rays are again reflected into the phototube 156 and the thyratron 182 becomes momentarily non-conducting, de-energizing the coil 218 of the sequence relay 186 and allowing its core and pawl to move to the right (Fig. 10) ready again to turn the ratchet when the coil 218 is again energized.

As soon as the second light reflecting plug 100b moves away from the Lucite rod, as the toe end of the sole is traversed, the thyratron 182 again becomes conductive and the coil 218 is again energized, turning the cam 230 to the position illustrated in Fig. 10, where the contact arm 232 is returned to its position against the contact 196. Current will then pass through the closed contacts 210 to the solenoid 202 which will lift the latch arm 224 against the spring 226 and will allow the lever 122 to be pushed back by the spring 83 (Fig. 9) on the cutter carrying slide 84 aided by the spring 146 under the lever 122 to the position shown in Fig. 7, thereby lifting the shank-reducing cutter 80. As the lever 122 is moved, its abutment 152 will release the switch 154 and allow the circuit through the contact 210 to the solenoid 202 to be opened and the circuit through the contact 206 to be again closed. No action will result, since the arm 232 is on 196. The core of the solenoid 202 and the latch 222 are then spring-returned to a displaced position, that of the latch being shown in dash lines in Fig. 8. This brings the switching elements back to the proper position for starting a new cycle and when the next reflecting button 100c, on the other side of the template, reaches a point opposite the Lucite rod, the shank-reducing cutter will again be lowered into operative position as previously described and held there until the plug 100d is reached. This allows the pawl on the core of de-energized coil 218 to be drawn to the next notch of the ratchet 228. When the plug 100d has been passed, the thyratron 182 becomes conductive, and the coil 218 is energized, moving the switch arm 232 to 196, releasing the latch 222 and allowing the cutter to rise. There the cutter stays as does the arm 232 while the heel end of the sole is treated and the arm 42 is finally withdrawn ready for the next cycle.

The invention having thus been described, what is claimed as new and desired to be secured by Letters Patent of the United States is:

1. In a machine for treating peripheral portions of a sole, a tool for use in operating on fractional sections of said portions, a sole-shaped template having spaced signals, a movable work support having clamps to hold a sole and a template for movement together, means for producing a relative traversing movement between the tool and the periphery of the sole, a carrier for said tool permitting movement of the tool thereon toward and away from the work, electromechanical means to move the tool toward the work, resilient means urging the tool away from the work, and a phototube mechanism responsive to successive signals to energize said tool moving means to bring the tool into operating position and then to release it for removal therefrom.

2. In a machine for treating peripheral portions of a sole, a driven tool for operating on fractional sections of said portions, a sole-shaped template having spaced signals, a movable work support having clamps to hold a sole and a template for movement together, means for producing a relative traversing movement between the tool and the periphery of the sole, a spring-biased carrier for said tool permitting movement of the tool thereon toward and away from the work, a solenoid to move said tool on its carrier against the work, and means adjacent to the tool including a phototube arranged, upon a traversing passage of one signal for then energizing said solenoid to move the tool against the work, and when activated after the next signal for permitting said tool to be withdrawn from the work.

3. In a machine for treating peripheral portions of a sole, a tool for operating on fractional sections of said portions, a sole-shaped template having spaced signals, a movable work support having clamps to hold a sole and a template for movement together, means for producing a relative traversing movement between the tool and the periphery of the sole, a carrier for said tool permitting movement of the tool thereon toward and away from the work, a solenoid to move the tool on its carrier as one signal is passed, a spring to resist said movement, a spring-operated latch to hold the tool in contact with the work, another solenoid to trip the latch when the next signal is passed, and a phototube mechanism responsive to said signals to control said solenoids.

4. In a machine for treating peripheral portions of a sole, a tool for operating on fractional sections of said portions, a sole-shaped template having spaced signals, a movable work support having clamps to hold a sole and the template for movement together, means for producing a relative traversing movement between the tool and the periphery of the sole, a movable carrier for said tool also permitting movement of the tool thereon toward and away from the work, and a template follower on the carrier controlling the position of the tool radially of a sole, said template follower having a scanning device comprising a phototube illuminated when the scanning device meets a signal and having a relay-operated solenoid controlled by said phototube for moving the tool heightwise on its carrier into engagement with the work.

5. In a machine for treating peripheral portions of a sole, a tool for operating on fractional sections of said portions, a sole-shaped template having spaced signals, a movable work support having clamps to hold a sole and a template for movement together, means for producing a relative traversing movement between the tool and the periphery of the sole, a carrier for said tool permitting movement of the tool thereon toward and away from the work, a phototube mechanism responsive to said signals to bring the tool into operating position and to remove it therefrom, said mechanism having a solenoid for moving the tool into contact with the work, a spring for resisting said movement, and a spring-returned switch positioned to be closed by movement of the tool to bring a second solenoid into connection with the phototube system whereby passage of the next signal will energize the second solenoid to unlatch the first and hence to release the spring-returned switch to bring the first solenoid into connection for operation by the next signal.

6. In a machine for treating peripheral portions of a sole, a tool for operating on fractional sections of said portions, a sole-shaped template having spaced reflecting signals, a movable work support having clamps to hold a sole and a template for movement together, means for producing a relative traversing movement between the tool and the periphery of the sole, a swinging carrier for said tool permitting movement of the tool thereon toward and away from the periphery of the work, said tool being mounted on the carrier for heightwise movement, another tool on the carrier positioned closely adjacent to the first tool, means for supporting said tool carrier movable under the control of the periphery of the template to determine the radial position of said tools, electromechanical means to move said first tool heightwise of the sole margin, and a phototube scanning said template periphery for illumination by signals thereon to control said electromechanical means successively in reverse directions as successive signals are encountered thereby to effect movements of said first tool into and out of operating engagement with the work.

References Cited in the file of this patent

UNITED STATES PATENTS

| | | |
|---|---|---|
| 2,441,403 | Engle et al. | May 11, 1948 |
| 2,682,674 | Stacey | July 6, 1954 |